United States Patent
Kousaka

(10) Patent No.: US 8,398,235 B2
(45) Date of Patent: Mar. 19, 2013

(54) PLASTIC LENS FOR SPECTACLES, PROCESS FOR PRODUCING THE SAME, AND COATING LIQUID APPLICATOR FOR USE IN THE PROCESS

(75) Inventor: Masahisa Kousaka, Shinjyuku-ku (JP)

(73) Assignee: Hoya Corporation, Tokyo (JP)

( * ) Notice: Subject to any disclaimer, the term of this patent is extended or adjusted under 35 U.S.C. 154(b) by 712 days.

(21) Appl. No.: 12/518,221

(22) PCT Filed: Dec. 7, 2007

(86) PCT No.: PCT/JP2007/073714
§ 371 (c)(1),
(2), (4) Date: Jun. 8, 2009

(87) PCT Pub. No.: WO2008/072580
PCT Pub. Date: Jun. 19, 2008

(65) Prior Publication Data
US 2010/0014048 A1    Jan. 21, 2010

(30) Foreign Application Priority Data
Dec. 8, 2006    (JP) .................................. 2006-332627

(51) Int. Cl.
G02C 7/02    (2006.01)
G02C 7/00    (2006.01)
(52) U.S. Cl. ............................. 351/159.73; 351/159.01
(58) Field of Classification Search ................. 351/159, 351/177, 159.01, 159.73–159.78, 159.57, 351/159.62, 159.67
See application file for complete search history.

(56) References Cited

U.S. PATENT DOCUMENTS

| | | | |
|---|---|---|---|
| 4,076,863 | A | 2/1978 | Onoki et al. |
| 6,860,600 | B2 * | 3/2005 | Chen .......................... 351/174 |
| 2002/0132954 | A1 | 9/2002 | Kosaka |
| 2002/0135732 | A1 | 9/2002 | Fujita |
| 2003/0231280 | A1 | 12/2003 | Muisener et al. |
| 2004/0096576 | A1 | 5/2004 | Chen |
| 2004/0141230 | A1 | 7/2004 | Kosaka |

FOREIGN PATENT DOCUMENTS

| | | |
|---|---|---|
| EP | 0 784 223 A1 | 7/1997 |
| EP | 1 085 348 A2 | 3/2001 |
| EP | 1 085 349 | 3/2001 |
| EP | 1 630 590 | 3/2006 |
| JP | 58 122501 | 7/1983 |
| JP | 7 230062 | 8/1995 |
| JP | 9 265059 | 10/1997 |
| JP | 2001 091906 | 4/2001 |
| JP | 2001 091908 | 4/2001 |
| JP | 2001 294812 | 10/2001 |
| JP | 2002 014303 | 1/2002 |
| WO | WO 02/27359 A1 | 4/2002 |
| WO | 2004 107021 | 12/2004 |

* cited by examiner

*Primary Examiner* — James Greece
(74) *Attorney, Agent, or Firm* — Oblon, Spivak, McClelland, Maier & Neustadt, L.L.P.

(57) ABSTRACT

The present invention provides a plastic lens for spectacles wherein a transparent hardened coating layer containing a UV absorbing agent is formed on a peripheral edge of the plastic lens which has been subjected to edging or on a machined surface of the plastic lens which has been subjected to machining for attachment to a frame, a process for producing the plastic lens for spectacles, and an applicator suited for use in such a process. Discoloration of the peripheral edge of the edged plastic lens for spectacles or the machined surface of the plastic lens machined for attachment to a frame is prevented.

24 Claims, 5 Drawing Sheets

Fig. 4
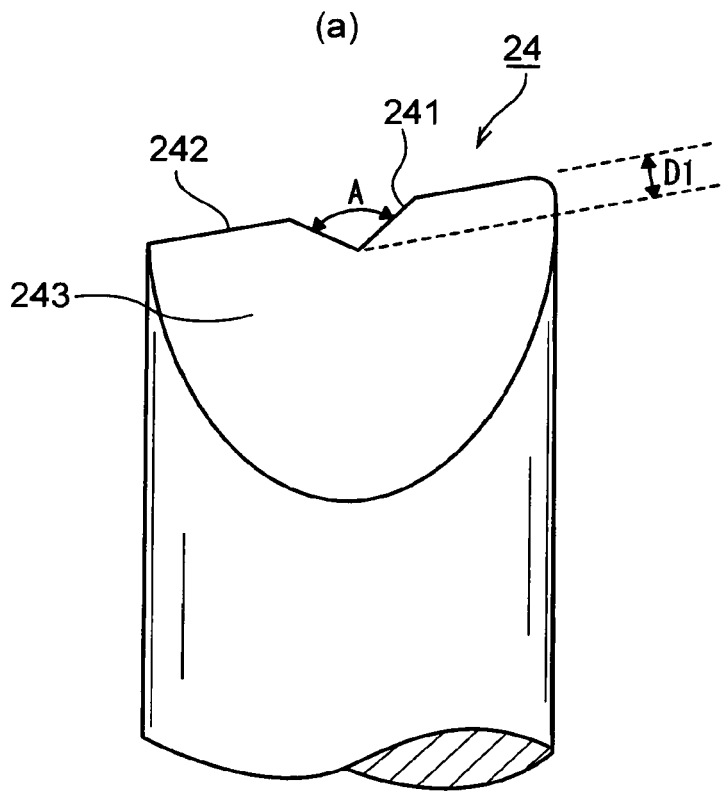
(a)
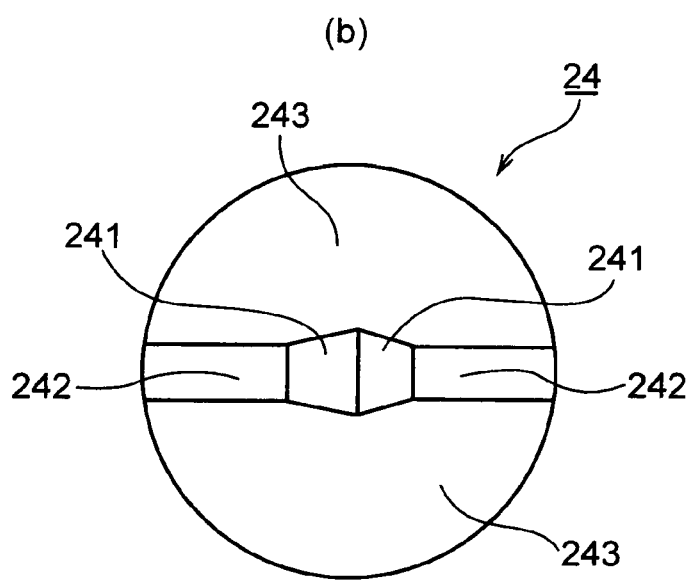
(b)

Fig. 5
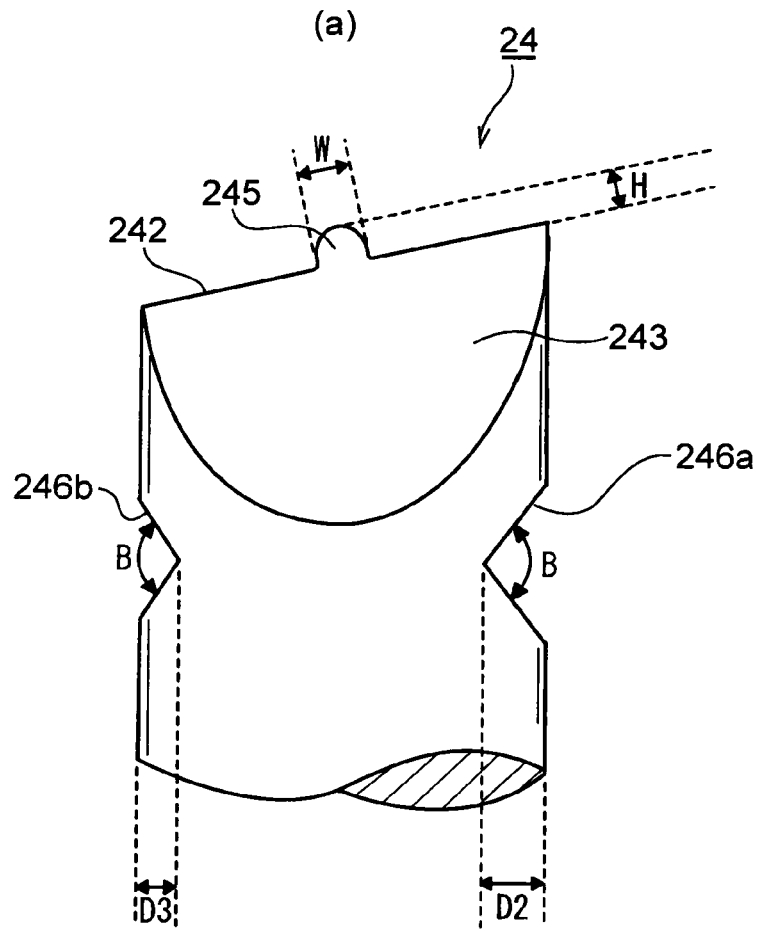
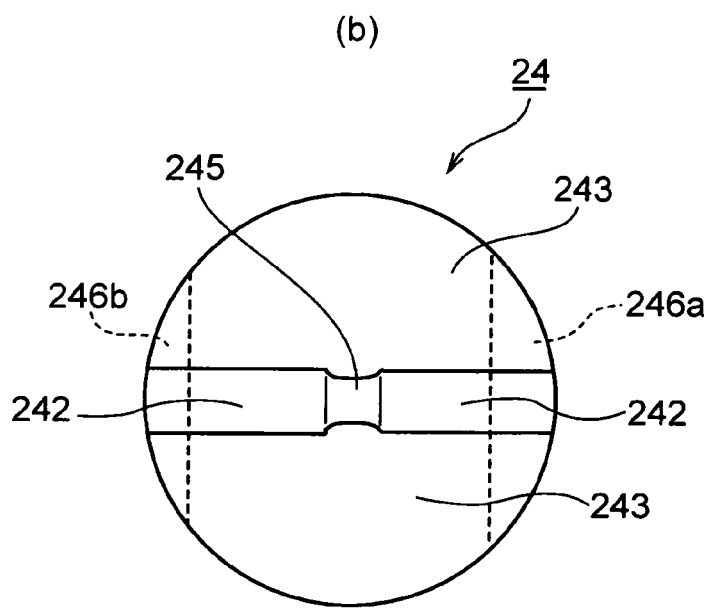

PLASTIC LENS FOR SPECTACLES, PROCESS FOR PRODUCING THE SAME, AND COATING LIQUID APPLICATOR FOR USE IN THE PROCESS

TECHNICAL FIELD

The present invention relates to a plastic lens for spectacles having improved light stability, to a process for producing the same, and to a coating liquid applicator for use in the process.

BACKGROUND ART

A general process starting from the production of conventional plastic lenses for spectacles until the attachment of the plastic lenses for spectacles to a spectacle frame will be briefly described below.

First, a plastic lens material is poured into a mold cavity and cured to form lenses with a predetermined shape by a known technique such as cast molding or injection molding. The formed lenses may be classified into those of a lens blank type (including semi-finished lenses) which has an optically unfinished surface on at least one side thereof, and those of a finished lens type which has optically finished surfaces on both sides thereof.

In the case of finished lenses, after various coatings such as hard coating, antireflection coating, water-repellent coating, antifog coating, antifouling coating and mirror coating have been applied to the lens surfaces including both the optical surfaces, the lenses are subjected to edging according to the order of the customer and is, if necessary, subjected to machining for attachment to a frame. Then, the machined lenses are attached to a spectacle frame, whereby a pair of spectacles is completed.

In the case of lens blanks, the optically unfinished optical surfaces are cut and polished into optically finished surfaces according to the order of the customer to form finished lenses. The subsequent process is the same as that for finished lenses; i.e. after various coatings have been applied to the lens surfaces, the lenses are subjected to edging and, if necessary, to machining for attachment to a frame and the machined lenses are then attached to a spectacle frame, whereby a pair of spectacles are completed.

The term "edging" as used herein is intended to refer to machining of an edge of the lens for shaping the lens to fit a lens rim of a given spectacle frame into which the lens is intended to be attached or to conform to a designated lens shape, and also refer to machining of the edge of the lens so that the lens has a desired peripheral edge shape (or example, to form a peripheral edge with a bevel, a flat surface or a groove or to chamfer the corners where the optical surfaces meet the peripheral edge).

The term "machining for attachment to a frame" as used herein is intended to refer to a machining operation to form holes, grooves or the like in an optical surface near the edge of the edged lens or in the peripheral edge of the edged lens when the lens is intended to be attached to a spectacle frame, such as a rimless frame, which does not have rims that surround lenses. The holes and grooves are used in attaching the lenses to the frame (endpieces or a bridge).

Edging and the machining for attachment to a frame are herein collectively referred to as "lens machining."

The term "bevel" as one example of the peripheral edge shapes is intended to refer to a ridge with a V-shaped protrusion which has a V-shaped cross-section and is formed circumferentially along the peripheral edge of the lens and is used when the lens is attached to a full-rim frame, for example.

The term "groove" as one example of the peripheral edge shapes is intended to refer to a groove used, for example, when the lens is attached to a mount for a semi-rimless spectacles (half-rim frame) or a spectacle frame having a wire rim or a thin plate rim. The groove is configured to be in fitting engagement with a member for supporting the lens, such as a band, e.g., a nylon yarn, a T-slot, a wire, a thin plate member or the like and is formed circumferentially along a part or entire peripheral edge of the lens. Such a groove generally has a cross-sectional shape having a width of about 0.5 to 1 mm and a depth of about 0.3 to 0.6 mm and a bottom with a semi-circular, V-shaped, rectangular or inverted trapezoidal shape.

The term "flat" as one example of the peripheral edge shapes is intended to refer to a peripheral edge shape of a lens which does not have any projections or recesses and is flat in cross-section and which is employed when the lens is intended to be fitted to a spectacle frame, such as a rimless frame, which does not have rims that surround lenses.

In some cases, the entire production process described above may be carried out in a lens maker and the completed spectacles may be delivered to an optician's shop or the customer. In other cases, the spectacles lenses which have been provided with various coatings but have not edged yet may be delivered from the lens maker to the optician's shop and edging and subsequent processes are carried out in the optician's shop. In still other cases, spectacles lenses which have been provided with various coatings and subjected to edging may be delivered from the lens maker to the optician's shop and the processes subsequent to the edging are carried out in the optician's shop.

FIG. 1 illustrates an example of a conventional edged plastic lens for spectacles which has been cut to fit a rimless frame generally called two-point or three-piece frame. In FIG. 1, a lens 10 is formed by edging a lens, which has optically finished optical surfaces on both sides thereof and is provided with various coatings including a hard coating, into a designated lens shape. Namely, the lens 10 has optical surfaces dens front surface 11 and lens back surface 12) with various coating including a hard coating thereon and a peripheral edge 13 where the lens substrate material is exposed as a result of the edging. The peripheral edge 13 has a dull finish in some cases and has a glossy finish obtained by polishing in other cases. The lens 10 has screw holes 14a and 14b (generally having a diameter of about 1.6 to 2.0 mm) for screws with a diameter of about 1.4 mm drilled at positions near its right and left peripheral portions and extending through the lens front and back surfaces so that lens-holding portions such as a bridge and an endpiece can be secured using the holes 14a and 14b and the screws with the lens front and back surfaces sandwiched therebetween.

In the embodiment shown FIG. 1, holes are formed through the optical surfaces by the machining for attachment to a frame. As other embodiments of the machining for attachment to a frame, there may be mentioned a hole extending from the peripheral edge of the lens into the inside of the lens (Patent Document 5 and Patent Document 7), a groove in the peripheral edge of the lens (Patent Document 6) and a groove in an optical surface of the lens (FIG. 14 of Patent Document 7).

The lens material used for plastic lenses for spectacles is discolored after shaping by the effect of light (Ultraviolet radiation (UV), in particular) from the ambient environment. In recent years, lenses having a high sulfur content (40% or higher, for example) and lenses containing a component having an aromatic ring are provided in response to increasing demand for a high refractive index. However, the problem is that these lenses are inferior in light stability as compared with conventional lenses. Thus, plastic lenses for spectacles are usually provided with UV absorbing capability. For example, the light stability of plastic lenses are improved by mixing an UV absorbing agent in a plastic lens monomer and polymerizing the monomer (Patent Documents 1 and 2), by immersing the plastic lenses in an aqueous solution containing an UV absorbing agent dispersed therein (Patent Document 3), or by applying a substance that absorbs and/or scatters UV to surfaces of the plastic lenses (Patent Document 4).

By imparting UV absorbing capability to plastic lenses as described above, discoloration of the lenses can be prevented to a large extent. Also, while the portions of lenses close to their surfaces are more likely to be discolored than their interior portions, the surfaces of lenses before edging are prevented from being discolored, since the surfaces of the lenses are provided with coatings such as a hard coatings and an antireflection coating as described before and since a component contained in the coatings such as Ti serves to reflect or absorb UV.

However, there is no coating such as a hard coating or an antireflection coating on a peripheral edge of a lens which has been subjected to edging or on a surface which has been subjected to machining for attachment to a frame (In the present specification, such a surface may be occasionally referred to simply as "machined surface for attachment to a frame." Further, the machined surface for attachment to a frame (such as the above-described interior surfaces of the screw holes 14a and 14b) and the peripheral edge of an lens which has been subjected to edging (peripheral surface formed by edging) may be occasionally referred to collectively as "machined lens surface"). Thus, the bare substrate material is exposed at the machined lens surfaces. Therefore, the portions of the lens close to these surfaces are more likely to be discolored than its interior portion and the lens surfaces (generally lens optical surfaces) which are coated with a hard coating or an antireflection coating.

Patent Document 1: JP S58-122501A
Patent Document 2: JP 2001-91906A
Patent Document 3: JP 2001-91908A
Patent Document 4: JP H09-265059A
Patent Document 5: JP H07-230062A
Patent Document 6: JP 2002-14303A
Patent Document 7: WO2004/107021A

DISCLOSURE OF THE INVENTION

The present invention has been made to solve the above problem, and it is, therefore, an object of the present invention to provide a plastic lens for spectacles which can prevent discoloration of its peripheral edge and its machined surface for attachment to a frame formed by lens machining, and a process for producing the same. Another object of the present invention is to provide an applicator for use in the process.

The present inventors have made an earnest study for achieving the above objectives and, as a result, have found that the above objectives can be achieved by applying a coating liquid containing a UV absorbing agent to the aforementioned lens machined surface and curing the coating to form a hardened coating layer thereon. The present invention has been accomplished on the basis of such a finding.

That is, the present invention provides as follows:

1. A plastic lens for spectacles wherein a transparent hardened coating layer containing a UV absorbing agent is formed on a peripheral edge of the plastic lens that has been subjected to edging;
2. A plastic lens for spectacles wherein a transparent hardened coating layer containing a UV absorbing agent is formed on a machined surface of the plastic lens that has been subjected to machining for attachment to a frame;
3. The plastic lens for spectacles as recited in above 1 or 2, wherein the UV absorbing agent is a benzotriazole-based compound;
4. The plastic lens for spectacles as recited in any one of above 1 to 3, wherein the hardened coating layer is formed from a coating liquid that is a one-part aqueous liquid containing a polyurethane emulsion;
5. The plastic lens for spectacles as recited in any one of above 1 to 3, wherein the hardened coating layer is formed from a coating liquid that is a two-part hardening material and is a mixed liquid comprising a first liquid containing a siloxane cross-linkable reactive polymer and a second liquid containing an organic silane compound;
6. The plastic lens for spectacles as recited in any one of above 1 to 5, wherein the hardened coating layer is formed from a coating liquid that contains a blue dye;
7. The plastic lens for spectacles as recited in any one of above 1 to 6, wherein the plastic lens has optical surfaces on both sides thereof, each of said optical surfaces being optically finished and provided with a hard coating;
8. A process for producing a plastic lens for spectacles, comprising the steps of edging a plastic lens, applying a coating liquid containing a UV absorbing agent to a peripheral edge of the plastic lens formed by the edging, and curing the applied coating liquid to form a transparent hardened coating layer;
9. A process for producing a plastic lens for spectacles, comprising the steps of machining of a plastic lens for attachment to a frame, applying a coating liquid containing a UV absorbing agent to a machined surface formed by the machining for attachment to a frame, and curing the applied coating liquid to form a transparent hardened coating layer;
10. The process for producing a plastic lens for spectacles as recited in above 8 or 9, wherein the UV absorbing agent is a benzotriazole-based compound;
11. The process for producing a plastic lens for spectacles as recited in any one of above 8 to 10, wherein the coating liquid is a one-part aqueous liquid containing a polyurethane emulsion;
12. The process for producing a plastic lens for spectacles as recited in any one of above 8 to 10, wherein the coating liquid is a two-part hardening material and is a mixed liquid comprising a first liquid containing a siloxane cross-linkable reactive polymer and a second liquid containing an organic silane compound;
13. The process for producing a plastic lens for spectacles as recited in any one of above 8 to 12, wherein the coating liquid contains a blue dye;
14. The process for producing a plastic lens for spectacles as recited in any one of above 8 to 13, wherein the produced plastic lens has optical surfaces on both sides thereof, each of said optical surfaces being optically finished and provided with a hard coating;
15. A coating liquid applicator comprising a container containing a coating liquid comprising a UV absorbing agent, an applying section that is in fluid communication with the container and configured to exude the coating liquid out of the container therethrough, and a sealing member that is configured to seal the applying section during a non-use stage, wherein the coating liquid is aqueous and wherein the applicator is used for applying the coating liquid to a plastic lens for spectacles;

16. The coating liquid applicator as recited in above 15, wherein the applicator is used for applying the coating liquid to a machined lens surface of the plastic lens for spectacles;

17. The coating liquid applicator as recited in claim 16, wherein the machined lens surface is a peripheral edge of the lens that has been subjected to edging;

18. The coating liquid applicator as recited in claim 16, wherein the machined lens surface is a machined surface of the lens that has been subjected to machining for attachment to a frame;

19. The coating liquid applicator as recited in any one of above 15 to 18, wherein the applying section comprises a brush head or a fibrous wick;

20. The coating liquid applicator as recited in any one of above 15 to 19, wherein the applying section is equipped with at least two, fine and bold applying sections;

21. The coating liquid applicator as recited in above 15, wherein the applying section is provided with a V-shaped notch for applying the coating liquid to a surface of a bevel formed on a peripheral edge of the lens; and 22. The coating liquid applicator as recited in above 15, wherein the applying section is provided with a protrusion for applying the coating liquid to an inside surface of a groove formed in a peripheral edge of the lens.

According to the present invention, there can be obtained a plastic lens for spectacles which is capable of preventing its peripheral edge formed by lens edging and its machined surface formed by machining for attachment to a frame from discoloring (yellowing, in particular) effectively. When light enters the lens substrate material through a peripheral edge thereof, which is discolored, then the lens substrate material may occasionally look discolored, since the peripheral edge of the lens surrounds the whole periphery thereof and has a large surface area. However, since the present invention prevents the peripheral edge from discoloring, the looking discolored of the substrate does not noticeably occur. It is particularly effective to apply the present invention to a peripheral edge which is not covered with a rim. Also, since the machined surface formed by machining for attachment to a frame is closer to the center of the lens than the peripheral edge is, such a surface, when discolored, may be noticeable from outside or may come into the sight of the spectacle wearer. However, since the present invention prevents such a machined surface from discoloring, discoloring thereof does not become noticeable.

In addition, it is effective to apply the present invention to the grooves and holes formed in the peripheral edge of the lens by edging or machining for attachment to a frame since they are seen from the front when the wearer wears the spectacles.

Moreover, the applicator of the present invention enables a coating liquid to be easily applied to the peripheral edge and machined surface for attachment to a frame of a lens, so that a hardened coating layer containing an UV absorbing agent can be easily formed.

BRIEF DESCRIPTION OF DRAWINGS

FIG. 4 includes a side view and a plan view of another embodiment of an applying section for use in a coating liquid applicator of the present invention.

FIG. 5 includes a side view and a plan view of another embodiment of an applying section for use in a coating liquid applicator of the present invention.

DESCRIPTION OF REFERENCE NUMERALS

Figure 1:
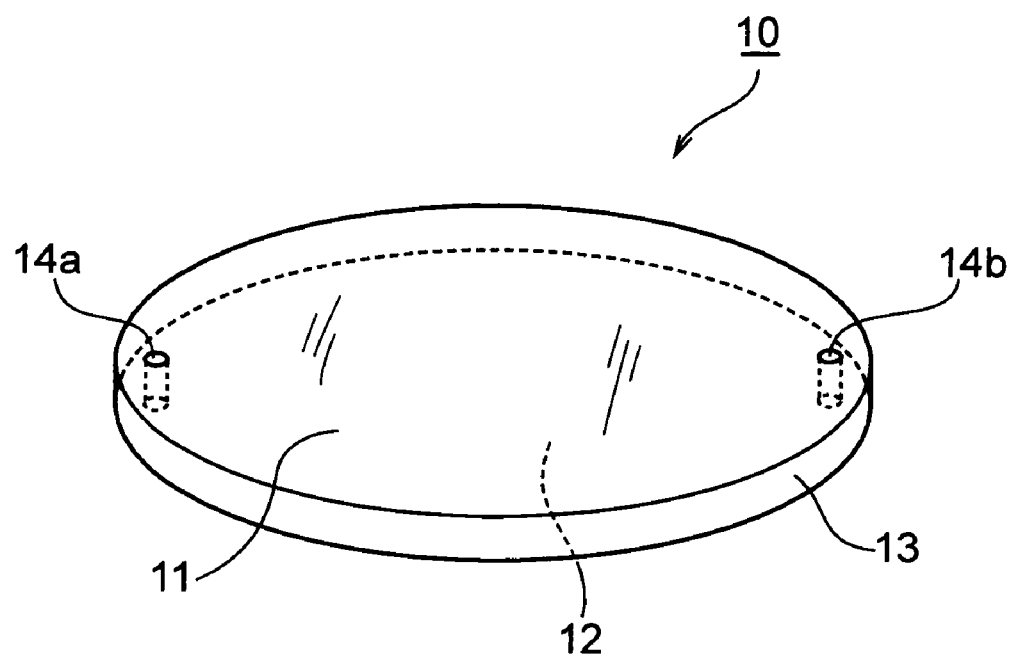
FIG. 1 is a perspective view of a conventional plastic lens for spectacles after edging.

10: plastic lens for spectacles
11: lens front surface
12: lens back surface
13: peripheral edge
14*a*, 14*b*: screw hole
20: coating liquid applicator
21: barrel
21*a*: end
22: coating liquid storing section
23: coating liquid guide pipe
24: applying section
24*a*: brush head
24*b*: small-diameter wick
24*c*: large-diameter wick
25: valve element
26: elastic member
27: brush head fixing pipe
28: cylindrical member
29: bellows-shaped movable member
30: knocking cap
40: cap
241: V-shaped notch in tip
242: end face
243: inclined face
245: protrusion
246*a*, 246*b*: V-shaped notch in side

BEST MODE FOR CARRYING OUT THE INVENTION

A plastic lens for spectacles according to the present invention is described below.

Firstly, there is described a plastic lens for spectacles according to a first embodiment of the present invention in which the machined lens surface to which the present invention is applied is a peripheral edge of the lens which has been subjected to edging (surface formed by edging).

The plastic lens for spectacles according to the first embodiment of the present invention is characterized by having a hardened coating layer containing an UV absorbing agent on the peripheral edge of the lens which has been subjected to edging. The plastic lens preferably has optically finished optical surfaces on both sides thereof, with each optical surface being coated with at least a hard coating.

The plastic lens for use in the present invention is not specifically limited as long as it is a lens for spectacles. The present invention is more effective for plastic lenses with relatively low light stability such as lenses having a high sulfur content (40% by weight or more). Examples of such lenses include polythiourethane-based resin lenses, polyurethane urea-based resin lenses, episulfide-based resin lenses, methacrylate-based resin lenses and polycarbonate-based resin lenses. The present invention is especially effective for plastic lenses having an Abbe number of 40 or less. This is because plastic lenses having an Abbe number of 40 or less are especially likely to be discolored (usually, yellowed).

Here, examples of plastic lenses having an Abbe number of 40 or less include polythiourethane-based resin lenses, episulfide-based resin lenses and polycarbonate-based resin lenses. These resins usually have an Abbe number in the range of 25 to 40.

Among the above lenses, the present invention is more effective for plastic lenses having a refractive index (ne) of 1.65 or higher. Examples of such lenses include polythiourethane-based resin lenses and episulfide-based resin lenses.

The hardened coating layer, which is formed on the peripheral edge of the plastic lens formed by the edging, serves to prevent discoloration of the peripheral edge due to oxidation degradation caused by UV SOx, NOx, and so on, and is formed by curing a coating liquid containing an UV absorbing agent as described later. Preferably, the hardened coating layer is a cured resin layer.

A process for producing the plastic lens for spectacles according to the present invention is next described.

The production process according to a first embodiment of the present invention includes the steps of edging a plastic lens, applying a coating liquid containing an UV absorbing agent to a peripheral edge of the plastic lens formed by the edging, and curing the applied coating liquid to form a transparent hardened coating layer. If desired, the production process may further include a step of, before the step of edging, forming coatings including at least a hard coating on any surface of the plastic lens having optically finished optical surfaces on both sides thereof, which surface may include both of the optical surfaces.

As described above, the plastic lens for spectacles is edged after having been coated with various coatings such as a hard coating and an antireflection coating. In the step of edging, an uncut lens having optically finished optical surfaces on both sides thereof and coated with various coatings including a hard coating is edged (subjected to edge grinding) so as to fit the shape of the rim of the spectacle frame to which the lens is intended to be attached or to match with a desired shape and a peripheral edge shape in accordance with the order.

In edging a lens, generally, the machining specifications for the lens are determined based on the spectacle wearer's prescription, the selected spectacle frame, the type of the lens (material or optical design), the designated machining method and so on, and the machining is carried out in the lens maker or optician's shop in accordance with the machining specifications.

As the coatings are removed from the peripheral edge by the edging process, the bare substrate material is exposed at the peripheral edge.

In the succeeding coating liquid applying step, a coating liquid containing a UV absorbing agent is applied to the peripheral edge of the plastic lens which has been edged in the above edging step.

The coating liquid is preferably applied only to the machined surface which has been subjected to edging. Thus, the coating liquid which has been applied by accident to an optical surface is desired to be removed by, for example, wiping.

The UV absorbing agent to be incorporated into the coating liquid is not specifically limited as long as it is a substance capable of absorbing UV. Examples of the UV absorbing agent include a benzotriazole-based compound, a benzophenone-based compound or a cyanoacrylate-based compound. A photostabilizer of a sterically hindered amine compound may also be used. Among these, the benzotriazole-based compound is preferred from the viewpoints of UV absorbing ability, durability, absorption wavelength range, etc.

Specific examples of the benzotriazole-based compound include 5-methyl-2-(2-hydroxy-4-decyloxyphenyl)benzotriazole, 5-methyl-2-(2-hydroxy-4-octyloxyphenyl)benzotriazole, 5-methyl-2-(2-hydroxy-4-dodecyloxyphenyl)benzotriazole, 5-methoxy-2-(2-hydroxy-4-octyloxyphenyl)benzotriazole, 5-ethoxy-2-(2-hydroxy-4-octyloxyphenyl)benzotriazole, 2-(2-hydroxy-5-methylphenyl)benzotriazole, 2-(3,5-di-t-pentyl-2-hydroxyphenyl)benzotriazole, 2-(3,5-di-t-butyl-2-hydroxyphenyl)benzotriazole, 2-(5-t-octyl-2-hydroxyphenyl)benzotriazole, 2-(4-octyloxy-2-hydroxyphenyl)benzotriazole, 5-chloro-2-(3,5-di-t-butyl-2-hydroxyphenyl)benzotriazole and 2-(3-t-butyl-2-hydroxy-5-methylphenyl)-5-chlorobenzotriazole.

Among these benzotriazole-based compounds, preferred are
5-methyl-2-(2-hydroxy-4-decyloxyphenyl)benzotriazole,
5-methyl-2-(2-hydroxy-4-octyloxyphenyl)benzotriazole,
5-methyl-2-(2-hydroxy-4-dodecyloxyphenyl)benzotriazole,
5-methoxy-2-(2-hydroxy-4-octyloxyphenyl)benzotriazole,
5-ethoxy-2-(2-hydroxy-4-octyloxyphenyl)benzotriazole,
5-chloro-2-(3,5-di-t-butyl-2-hydroxyphenyl)benzotriazole and
2-(3-t-butyl-2-hydroxy-5-methylphenyl)-5-chlorobenzotriazole.

Specific examples of the benzophenone-based compound include 2-hydroxy-4-octyloxybenzophenone, 2,2',4,4'-tetrahydroxy-4-octyloxybenzophenone, 2,2',4'-trihydroxy-4-octyloxybenzophenone, 2,2'-dihydroxy-4-methoxybenzophenone, 2,2'-dihydroxy-4-n-octoxybenzophenone, 2-hydroxybenzophenone, 2,4-dihydroxybenzophenone, 2-hydroxy-4-methoxybenzophenone, 2,2',4-trihydroxybenzophenone, 2,2'-dihydroxy-4-methoxybenzophenone and 2,2',4,4'-tetrahydroxy-benzophenone.

Specific examples of the cyanoacrylate-based compound include 2-ethylhexyl-2-cyano-3,3'-diphenyl acrylate and ethyl-2-cyano-3,3'-diphenyl acrylate.

Examples of the sterically hindered amine compound include photostabilizers generally called HALS such as bis (2,2,6,6-tetramethyl-4-piperidyl) sebacate and dimethyl succinate -1-(2-hydroxy-2,2,6,6-tetramethyl-piperidine.

The coating liquid for use in the production process of the present invention may be (1) a one-part aqueous liquid containing a polyurethane emulsion or (2) a two-part hardening material composed of a first liquid (base compound) containing a siloxane cross-linkable reactive polymer and a second liquid (curing agent) containing an organic silane compound which are mixed shortly before application. The one-part aqueous liquid has a dry-to-touch time (the time required to become tack-free to the touch) longer than that of a two-part hardening coating liquid and can be easily removed by wiping or washing with water before it becomes dry to the touch. Therefore, the one-part aqueous liquid is easy to handle because it can be removed even if it deposits onto an optical surface or can be reapplied. The one-part aqueous liquid is particularly preferred in that it can be easily applied even when, for example, it is applied by an unskilled person in an optician's shop.

The coating liquid formed from the two-part hardening liquid material is preferred in that it requires a short drying time and a large amount of items can be treated relatively rapidly with consistent quality in a factory of the lens maker or the like since it has a dry-to-touch time (the time required to become tack-free to the touch) shorter than that of a one-part curable coating liquid.

No matter whether the coating liquid is a one-part aqueous liquid or a two-part hardening liquid material, an normal temperature curable coating liquid that cures at room temperature is preferred since it can be dried at room temperature without the use of a special device.

As the polyurethane emulsion for the one-part aqueous coating liquid, any commercially available polyurethane emulsion can be used. Examples of the polyurethane emulsion include polyurethane emulsions using, for example, a carbonate polyol, a polyester polyol, a polyoxy-polyalkylene polyol, a polycarbonate diol, a polyester diol or a polyoxy-polyalkylene diol. One specific example is UVS-111W (tradename) available from Dicson Inc.

As the siloxane cross-linkable reactive polymer for the first liquid as well as the organic silane compound for the second liquid which are used in the two-part hardening coating liquid, any commercially available compound may be used. One specific example is UVS-111S (trade name) manufactured by Dicson Inc.

Preferably, the approximate period of time during which the mixture can be used (pot life) after the mixing of the two liquids is in the range of about 4 to 5 hours at room temperature in view of the workability.

In some cases, the hardened coating layer containing an UV absorbing agent has a pale yellow color due to its property of absorbing light in the short wavelength region. In such a case, it is preferable to mix a blue dye in advance in the coating liquid since the color of the hardened coating layer itself becomes unnoticeable. As the bluing agent as the blue dye, Dia Resin Blue G (tradename; available from Mitsubishi Chemical Corporation), for example, may be used. The blue dye is preferably added and dissolved with stirring in the coating liquid before the applying step in an amount of 50 to 500 ppb based on the amount of the coating liquid.

In the step of applying the coating liquid described above, it is preferred that the coating liquid be applied by bringing a coating liquid retaining member, which can absorb and retain the coating liquid and is made of a flexible material, into contact with the peripheral edge of the spectacle lens and moving them relative to each other, no matter whether the coating liquid is a one-part aqueous liquid or a two-part hardening liquid material. With such a procedure, the coating liquid can be applied to a predetermined uniform thickness without causing the coating liquid to adhere to the optical surfaces and damaging the optical surfaces. Examples of the material for the coating liquid retaining member include natural fibers, animal hair fibers, synthetic resin fibers and a bundle, woven fabric or nonwoven fabric of these fibers, porous resins and foamed resins. Specific examples of the coating liquid retaining member include brush, paint brush, sponge, foamed rubber, nonwoven fabric, and felt.

In the case of the one-part aqueous coating liquid, an applicator comprising an applying section including the coating liquid retaining member as described above, and a container which holds the coating liquid or the applying section impregnated with the coating liquid and which is adapted to supply the coating liquid to the applying section is preferably used, since the application of the coating liquid is facilitated. It is especially preferred that the coating liquid be charged in an applicator of the present invention, which is described later, and applied using the applicator, since the coating liquid can be easily applied in an optician's shop or the like.

The coating liquid applied in the applying step is then cured in the next curing step. In the case of the one-part aqueous coating liquid, the curing time is preferably about 30 minutes for dry-to-touch time and about 1 to 48 hours for dry-hard time at room temperature.

In the case of the two-part hardening coating liquid, the curing time is preferably about 15 minutes for dry-to-touch time and about 1 to 48 hours for dry-hard time at room temperature.

Whether the coating liquid is a one-part aqueous liquid or a two-part hardening liquid material, the coating thickness is preferably 0.5 to 10 µm in view of the effect of the UV absorbing agent, the time necessary to cure, and the adhesion of the coating. More preferably, the coating thickness is 1 to 5 µm. A coating thickness in this range provides an advantage that, if the peripheral edge of the lens has a dull finish, the dull finish state can be maintained to some extent. A coating liquid containing a flatting agent for forming a dull surface may be separately prepared.

The lens may be placed in a high temperature atmosphere using a drying furnace to shorten the drying time as long as the lens is not adversely affected.

A second embodiment in which the machined lens surface to which the present invention is applied is a machined surface for attachment to a frame is next described.

A plastic lens for spectacles according to the second embodiment of the present invention is characterized in that the lens which has been subjected to edging is further subjected to machining for attachment to a frame and that the machined surface is formed with a hardened coating layer containing an UV absorbing agent. Preferably, the plastic lens before edging has optically finished optical surfaces on both sides thereof and is provided with at least a hard coating.

The spectacle lens and coating liquid for use in the second embodiment are the same as those used in the above-described first embodiment and, hence, their description is omitted here.

The production process according to the second embodiment of the present invention includes the steps of machining a plastic lens for attachment to a frame, applying a coating liquid containing an UV absorbing agent to the surface machined for attachment to a frame, and curing the applied coating liquid to form a transparent hardened coating layer. If desired, the production process may further include a step of edging the plastic lens before the step of machining the plastic lens for attachment to a frame, and, further, a step of, before the step of edging, forming coatings including at least a hard coating on any surface of the plastic lens having optically finished optical surfaces on both sides thereof, which surface may include both of the optical surfaces.

As described above, the plastic lens for spectacles is subjected to edging after various coatings such as a hard coating and an antireflection coating have been provided thereon, and then subjected to machining for attachment to a frame. The step of machining for attachment to a frame is carried out for the purpose of forming holes or grooves in both the optical surfaces or peripheral edge of the lens when the lens is intended to be fitted in a rimless spectacle frame, for example. The machining of the lens for attachment to a frame may be carried out in correspondence to the rimless spectacle frame to which the lens is intended to be attached. The machining for attachment to a frame is performed in the lens maker or optician's shop. As the coatings are removed by the machining for attachment to a frame, the bare substrate material is exposed at the machined surface.

In this second embodiment, a hardened coating layer is also preferably formed on the surface formed by the edging process as in the first embodiment. In this case, the coating liquid may be applied to the machined surfaces formed by the edging process and the machining for attachment to a frame. Alternatively, the machining for attachment to a frame may be carried out after a hardened coating layer has been formed on the peripheral edge formed by the edging process in the same manner as in the first embodiment. The resulting machined surface is then formed with a hardened coating layer.

A coating liquid applicator of the present invention is a coating liquid applicator having a container containing a coating liquid containing an UV absorbing agent, an applying section that is in fluid communication with the container and configured to exude the coating liquid out of the container, and a sealing member for sealing the applying section while not in use, and is used to apply the coating liquid to a plastic lens for spectacles, preferably to machined lens surfaces thereof. Suitable examples of the machined lens surfaces include a machined surface (peripheral edge) of a plastic lens for spectacles having optically finished surfaces on both sides thereof and being provided with at least a hard coating and subjected to edging, and a machined surface of a plastic lens for spectacles which has been subjected to machining for attachment to a frame after edging. The coating liquid is preferably aqueous.

More preferably, the coating liquid applicator has at least two, fine and bold applying sections. However, even when the coating liquid applicator has only one applying section, the coating liquid can be suitably applied to various machined surfaces if the applying section has both a fine end portion and a trunk portion as in the case of a brush head, for example. In such a case, the fine end portion (tip in the case of a brush) can be used to apply the coating liquid to surfaces of hollows such as holes and grooves, while the trunk portion can be used to apply the coating liquid broadly to the peripheral edge of a lens.

The coating liquid applicator preferably has an applying section which is fine enough to be inserted into, for example, the drilled screw hole 14*a* and 14*b* as shown in FIG. 1 (when used to apply the coating liquid to surfaces of screw holes with a diameter 1.6 to 2.0 mm, for example, an applying section preferably has a diameter of not greater than 1.6 mm, which is the minimum diameter of the holes) so that the coating liquid can be easily applied to the interior surfaces of the holes.

The applying section may have a protrusion with dimensions that allow insertion thereof into grooves of lenses formed circumferentially along the peripheral edge thereof for attachment to a mount for a semi-rimless spectacle (half-rim frame) (for example, when the coating liquid is applied into grooves with a width of 0.6 to 1.0 mm and a depth of 0.35 to 0.5 mm, a protrusion with a width of not greater than 0.6 mm, which is the minimum width of the grooves, and a height of not greater than 0.5 mm, which is the maximum depth of the grooves, is desired) so that it can be used to apply the coating liquid to the groove. More preferably, the protrusion has a shape that matches the shape of the groove into which the coating liquid is intended to be applied (for example, the tip of the protrusion has a semi-circular cross-sectional shape when the bottom of the groove is a semi-circular, or a V-shaped cross-sectional shape when the bottom of the groove is V-shaped).

It is preferred that the applying section has a straight portion or flat portion (at its end or side, for example) which provides a large width of contact with a peripheral edge of a lens in the width direction thereof so that the coating liquid can be applied to a wide area on the peripheral edge of the lens when the peripheral edge has a flat surface (surface cut flat).

It is also preferred that the applying section has a groove which partially mates with a bevel on a lens so that the coating liquid can be applied to the peripheral edge having the bevel thereon. More preferably, the groove has a generally V-shaped cross-sectional shape since the bevel is of a V-shaped cross-sectional shape.

The container preferably includes a material or film that prevents transmission of UV therethrough. In this case, the material or film prevents heat generation of the UV absorbing agent in the container due to absorption of UV, and therefore prevents degradation of the coating liquid. The sealing mechanism preferably has a structure, such as a cap or lid, which can seal the applying section while not in use and expose the applying section during use.

A coating liquid applicator of the present invention is next described based on embodiments shown in drawings.

Figure 2:
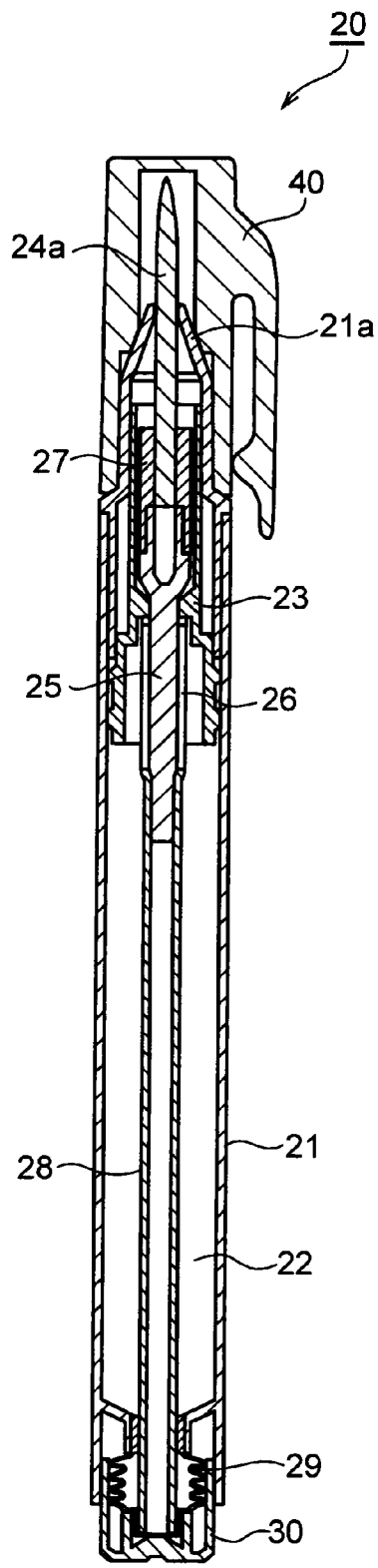
FIG. 2 is a cross-sectional schematic view of an embodiment of a coating liquid applicator of the present invention.

FIG. 2 is a cross-sectional schematic view illustrating one embodiment of the coating liquid applicator of the present invention, and represents a case in which the applying section is composed of a brush head.

A coating liquid applicator 20 depicted in FIG. 2 has a barrel 21 which serves as a casing of the applicator, a coating liquid storing section 22, a coating liquid guide pipe 23, and a brush head 24*a* serving as an applying section 24, and is configured such that the coating liquid in the coating liquid storing section 22 is supplied to the brush head 24*a* at an end 21*a* of the barrel 21.

The coating liquid applicator 20 depicted in FIG. 2 is provided with a knock mechanism. The knock mechanism is composed of a valve mechanism disposed between the end 21*a* of the barrel 21 and the coating liquid storing section 22, a cylindrical member 28 connected to a valve element 25 and an elastic member 26, a bellows-shaped movable member 29 connected to the cylindrical member 28 for transmitting knock motion, and a knocking cap 30. Here, the valve mechanism is comprised of the valve element 25, the elastic member 26 such as a coil spring, a brush head fixing pipe 27, and the coating liquid guide pipe 23.

When the knocking cap 30 is pressed, the bellows-shaped movable member 29 is contracted and the cylindrical member 28 is moved forward in the knock mechanism. Then, the cylindrical member 28 is moved forward against the elastic force of the elastic member 26 by the movement of the valve element 25, so that a gap is formed between the valve element 25 and the coating liquid guide pipe 23, whereby the valve mechanism is opened. At this time, since the brush head 24*a* moves together with the valve element 25 since the brush head 24*a* is coupled with the brush head fixing pipe 27 and the valve element 25. When the valve mechanism is opened, the coating liquid in the coating liquid storing section 22 moves into the end 21*a* of the barrel 21, and flows to the outside through interstices among the fibers of the brush head and the gap between the brush head and the inside surface of the opening at the end 21*a*. The coating liquid flows out of the end 21*a* is absorbed into the tip of the brush head 24*a*, ready to be applied. The valve element 25 and the brush head fixing pipe 27 are coupled with each other by means such as press-fitting, threading, fitting or adhesive bonding.

The brush head 24*a*, which is formed by longitudinally bundling a multiplicity of fibers such as natural fibers made of hairs of an animal such as weasel, horse or pig, synthetic resin fibers such as nylon, polyethylene terephthalate or acrylic fibers, or mixture of the natural brush hairs and synthetic resin brush hairs and which has a straight portion in one side having a flange portion formed by bonding the fibers by means such as thermal fusion bonding or adhesive bonding and a taper portion at the other side tapered so that its outer diameter becomes smaller toward the tip, is fitted in the brush head fixing pipe 27 with its unbonded end located on the front side of the brush head fixing pipe 27. The front portion of the brush head 24*a* protrudes from the opening at the end of the end 21*a* of the barrel 21, and the flange portion at the rear end of the brush head 24a is in contact with the brush head fixing pipe 27 and clamped between a stepped portion of the brush head fixing pipe 27 and the front end face of the valve element 25. The brush head having a tapered tip as described above is preferred since the coating liquid can be easily applied to both a peripheral edge of a lens and a machined surface of the lens for attachment to a frame. Also, the brush head is preferred since it can be easily deformed and therefore can be used to apply the coating liquid to machined surfaces of various shapes. While the brush head has a tapered tip in the above example, the tip may be cut straight across so that it can be used to apply the coating liquid broadly to the peripheral edge.

Figure 3:
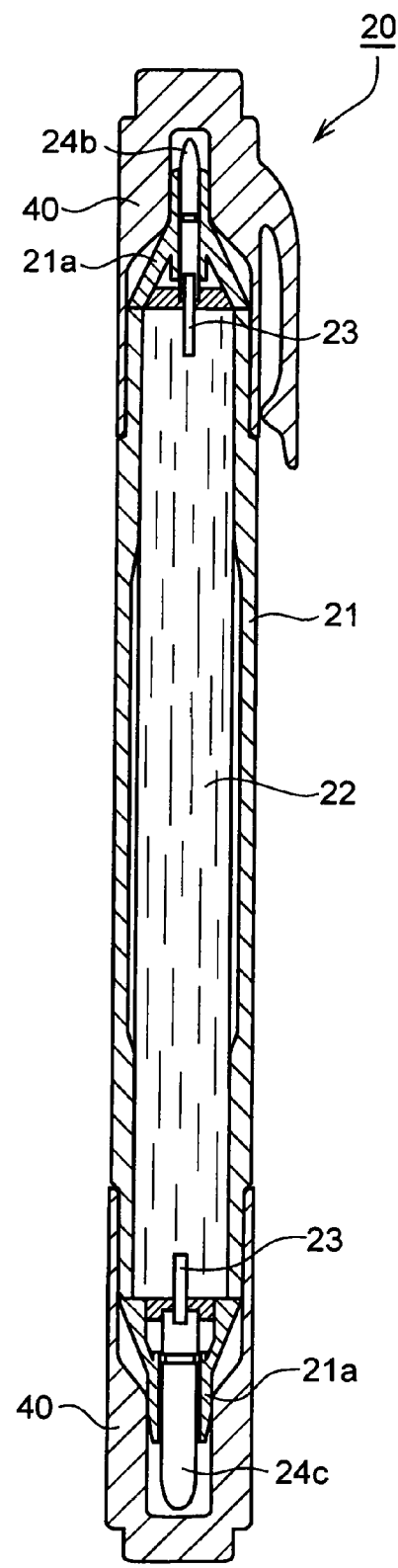
FIG. 3 is a cross-sectional schematic view of another embodiment of a coating liquid applicator of the present invention.

FIG. 3 is a cross-sectional schematic view illustrating another embodiment of the coating liquid applicator 20 of the present invention, and represents a twin type applicator.

The coating liquid applicator 20 depicted in FIG. 3 has a barrel 21 which serves as a casing of the applicator, a coating liquid storing section 22, a coating liquid guide pipes 23, and applying sections 24, and is configured such that the coating liquid in the coating liquid storing section 22 is supplied to the applying sections 24 in ends 21a at both ends of the barrel 21 through the coating liquid guide pipes 23. A coating liquid absorbing and storing element may be disposed in the coating liquid storing section 22, if desired.

The coating liquid applicator 20 preferably has at least two applying sections 24, i.e., fine and bold applying sections. In FIG. 3, the coating liquid applicator 20 has a small-diameter wick element 24b and a large-diameter wick element 24c as the applying sections 24. The dimensions of the small-diameter wick element 24b are preferably determined based on the shape of common screw holes as described before and the shapes of the screw holes into which the coating liquid is intended to be applied. For example, in this embodiment, the small-diameter wick element 24b has a diameter of not greater than 1.6 mm, which is the minimum diameter of the holes into which the coating liquid is intended to be applied, so that the coating liquid can be applied to surfaces of screw holes with a diameter of 1.6 to 2.0 mm. The length (the height of the portion having a generally cylindrical surface) is preferably generally equal to or greater than the maximum thickness of the edges of the lenses to which the coating liquid is intended to be applied so that the coating liquid can be applied to the entire inside surface of the screw holes by inserting the small-diameter wick into the screw holes through one of their openings. Even when the length is smaller than the maximum thickness of the edges of the lenses to which the coating liquid is intended to be applied, the coating liquid can be applied to the inside surface of the screw holes by inserting the small-diameter wick into the screw holes through the openings at both sides thereof when the length is equal to or greater than a half of the maximum thickness.

As for the dimensions of the large-diameter wick element 24c, the length thereof (the height of the portion having a generally cylindrical surface) is preferably equal to or greater than the maximum width of the peripheral edges of the lenses to which the coating liquid is intended to be applied since the coating liquid can be applied to the entire peripheral edge of a lens by contacting a side of the large-diameter wick to the peripheral edge from the side of one of the optical surfaces thereof. Even when the length is smaller than the maximum thickness of the edges of the lenses to which the coating liquid is intended to be applied, the coating liquid can be applied to the peripheral edge of a lens by contacting a side of the large-diameter wick to the peripheral edge from the sides of both the optical surfaces when the length is equal to or greater than a half of the maximum thickness. While an example in which the applying sections have a tapered tip is shown in this embodiment, the tip of the applying sections may be a straight or flat portion which can be contacted to the peripheral edge of a lens when the coating liquid is applied thereto. In this case, the width of the straight or flat portion is preferably generally equal to or greater than the maximum thickness of the edges of the lenses to which the coating liquid is intended to be applied.

As the small-diameter wick element 24b and the large-diameter wick element 24c, there may be used a wick element formed from a parallel fiber bundle composed of natural fibers, animal hair fibers, polyacetal resin fibers, acrylic resin fibers, polyester resin fibers, polyamide resin fibers, polyurethane resin fibers, polyolefin resin fibers, polyvinyl resin fibers, polycarbonate resin fibers, polyether resin fibers, polyphenylene resin fibers or fibers composed of a combination of two or more of the above fibers, a fibrous wick obtained by processing a fiber material such as felt or treating such a fiber material with a resin, or a porous element obtained by sintering or melt-setting of a variety of plastic powders or the like may be used and their shapes are selected based on the configuration of the applicator 20.

In other words, a felt wick, a sliver wick, a fiber bundle wick, a sintered wick, etc. can be used as the small-diameter wick element 24b and the large-diameter wick element 24c fitted in the ends 21a at both ends of the barrel 21. In the case of a twin type, the applying sections 24 may either have the same structure or different structures.

In the present invention, each of the applying sections 24 is preferably made of a brush head as describe above or a fibrous wick such as a felt wick.

A fibrous wick such as a felt wick is preferred in that the thickness of the coating liquid being applied can be easily controlled and the coating liquid can be easily applied thinly and uniformly. A brush head is preferred in that it can be easily contacted with the peripheral edge of a lens even when the peripheral edge of the lens is not flat.

As depicted in FIG. 2 and FIG. 3, a removable cap 40 as a sealing member which can seal the applying section 24 when the applicator 20 is not used is attached to each end 21a of the barrel 21 to prevent evaporation, leakage or solidification of the coating liquid and to protect the applying section 24.

Other embodiments of the applying section 24 are next described. FIG. 4 and FIG. 5 include a side view (a) and a plan view (b) of another example of the applying section 24 of the applicator 20, and depict an example of the applying section 24 suitable to apply the coating liquid to a bevel or into a groove formed circumferentially along the peripheral edge 13. FIG. 4 depicts a case where the applying section 24 has a V-shaped notch 241 in its tip, and FIG. 5 depicts a case where the applying section 24 has a protrusion 245 protruding from its tip and a plurality of V-shaped notches 246a and 246b in its sides.

The applying section 24 depicted in FIG. 4 is made of a cylindrical felt wick, and has an end face 242 extending obliquely at its tip, and inclined faces 243 extending obliquely from both sides of the end face 242. A V-shaped notch 241 is formed approximately in the center of the end face 242. The V-shaped notch 241 has an angle A and a depth D1 which are appropriately set based on the shape of the bevel to which the coating liquid is intended to be applied. For example, when the coating liquid is applied to a bevel having an apex angle of 105° to 125° and a height of 0.5 to 0.9 mm, the angle A of the V-shaped notch 241 may be set to 105°, which is equal to the minimum apex angle of the bevel, and the depth D1 of the V-shaped notch 241 may be set to 0.7 mm, which is close to the medium value of the target range. With such a configuration, when the applying section 24 is slidingly moved in the circumferential direction of the lens while being pressed against the peripheral edge 13 under such a condition that the V-shaped notch 241 of the applying section is kept mated with the bevel on the peripheral edge 13, the applying section 24 undergoes elastic and shrinkage deformation, so that the coating liquid can be applied to the surface of a bevel with an apex angle and a height within the target ranges. The coating liquid is also applied to portions along an outside of the bevel since the end face 242 contacts therewith.

The apex angle of the bevel to which the applying section 24 can apply the coating liquid can be varied by adjusting the angle at which the applying section 24 contacts with the peripheral edge 13 or the orientation of the applying section 24 when the coating liquid is applied (the coating liquid can be applied to a bevel with a large apex angle when the applying section 24 is inclined, and the coating liquid can be applied to a bevel with a small apex angle when the applying section 24 is turned). Therefore, the dimensions of the V-shaped notch may be determined in view of the above point so that it can cover the shapes of the bevel to which the coating liquid is intended to be applied.

The applying section 24 depicted in FIG. 5 is made of a cylindrical felt wick as in the case with the applying section 24 depicted in FIG. 4, and has an end face 242 extending obliquely at its tip, and inclined faces 243 extending obliquely from both sides of the end face 242. A protrusion 245 having a tip with a semi-circular cross-sectional shape protrudes in a direction perpendicular to the end face from approximately the center of the end face 242. The protrusion 245 has a height H and a width W which are determined appropriately based on the shapes of the grooves into which the coating liquid is intended to be applied. For example, when the coating liquid is applied into grooves for fitting a mount for semi-rimless spectacles (half-rim frame) with a depth of 0.35 to 0.5 mm and a width of 0.6 mm having a semi-circular bottom, the height H of the protrusion 245 may be suitably set to 0.5 mm, which is equal to the maximum value of the groove depths, and the width W is suitably set to approximately 0.6 mm, which is generally equal to the groove width. With such a configuration, when the applying section 24 is slidingly moved in the circumferential direction of the lens while being pressed against the peripheral edge 13 under such a condition that the protrusion 245 of the applying section is kept mated with the groove in the peripheral edge 13, the applying section 24 undergoes elastic and shrinkage deformation, so that the coating liquid can be applied to the inside surface of the groove with dimensions within the target ranges in the peripheral edge 13. The coating liquid is also applied to the portions of the peripheral edge 13 along both outsides of the groove since the end face 242 contacts therewith.

Since the width and depth of the groove in the peripheral edge 13 into which the applying section 24 can apply the coating liquid can be varied by adjusting the orientation or the contact angle of the protrusion 245, the dimensions of the protrusion may be set in view of the above point so that it can cover the shapes of the grooves into which the coating liquid is intended to be applied.

The applying section 24 has two V-shaped notches 246a and 246b with different shapes in its sides. In this embodiment, the V-shaped notches have the same angle B but different depths. The one with a larger depth is shown as V-shaped notch 246a, whereas the other with a shallower depth is shown as V-shaped notch 246b. The angles and depths of the two V-shaped notches 246a and 246b may be appropriately determined based on the shape of the bevel to which the coating liquid is intended to be applied. For example, when the coating liquid is applied to a bevel with an apex angle of 105° to 125° and a height of 0.5 to 0.9 mm, it is preferred that the angle B of each of the V-shaped notches 246a and 246b be set to 105°, which is equal to the minimum apex angle of the bevel, and the depth D2 of the V-shaped notch 246a and the depth D3 of the V-shaped notch 246b be set to 0.8 mm and 6.0 mm, respectively. Then, the coating liquid can be applied to a wide variety of target bevels with a small amount of deformation of the applying section. The angle B of the V-shaped notch 246a may be different from that of the V-shaped notch 246b.

It is preferred to round off an end (corner) of the end face 242 of the applying section 24 depicted in FIG. 4 to form a generally semi-circular cross-sectional shape as shown in FIG. 4 since the rounded end exhibits an effect similar to that of the protrusion 245 depicted in FIG. 5 and the functions of the applying section 24 as depicted in FIG. 4 can be increased.

While a felt wick is used as the material for the applying section 24 in FIG. 4 and FIG. 5, a fibrous wick prepared by shaping fibers such as acrylic fibers, polyester fibers or nylon fibers, or a sintered wick prepared by sintering organic polymer fine particles may be used.

The container of the coating liquid applicator 20 of the present invention may be made of any synthetic resin ordinarily used for this purpose. The synthetic resin material preferably contains a pigment such as carbon black or titanium oxide in order to prevent transmission of UV therethrough.

The coating liquid absorbing and storing element, which is disposed as desired in the coating liquid storing section 22 of the coating liquid applicator 20 of the present invention for impregnation with the coating liquid, is obtained by processing a fiber bundle composed of natural fibers, animal hair fibers, polyacetal resin fibers, acrylic resin fibers, polyester resin fibers, polyamide resin fibers, polyurethane resin fibers, polyolefin resin fibers, polyvinyl resin fibers, polycarbonate resin fibers, polyether resin fibers, polyphenylene resin fibers, or fibers composed of a combination of two or more of the above fibers, or a fiber bundle of a material such as felt.

The length of the coating liquid guide pipe 23 is determined appropriately based on the type of the applying section 24. When a coating liquid absorbing and storing element is disposed in the coating liquid storing section 22, since the length from each front end of the coating liquid absorbing and storing element to the applying section 24 is determined by the capillary force of the coating liquid absorbing and storing element, it is preferable to determine the length of the coating liquid guide pipe within the range of the above length.

The coating liquid flow path in the coating liquid guide pipe 23 preferably has a cross-sectional area of 0.8 to 80 mm$^2$, more preferably 0.8 to 20 mm$^2$ in order to allow the coating liquid to smoothly flow through the coating liquid guide pipe 23.

When the cross-sectional area of the coating liquid flow path lies within the range of 0.8 to 80 mm$^2$, an appropriate amount of the coating liquid flows out of the applying section 24.

The surface of the coating liquid guide pipe 23 which contacts with the coating liquid or the material itself of the coating liquid guide pipe 23 preferably has a surface tension which is lower than that of the coating liquid, in order to allow the coating liquid to be smoothly supplied from the coating liquid absorbing and storing element to the applying section 24. When the surface tension of the surface of the coating liquid guide pipe 23 which is intended to contact with the coating liquid is higher than that of the coating liquid, the surface tension of the surface can be lowered below that of the coating liquid by treating the coating liquid guide pipe 23 with a fluororesin, silicone rubber or silicone resin. The coating liquid guide pipe may be made of the same material as that of the applying section and formed integrally with the applying section.

The configurations or structures of the applicator and the applying section described above may also be combined appropriately.

EXAMPLES

The present invention will be described in more detail below by way of examples. However, these examples are not intended to limit the present invention thereto.

The following lens blanks 1 to 4 were used in these examples.

Blank 1:

Bis(β-epithiopropyl) sulfide in an amount of 76.5 parts by mass was mixed while heating under reduced pressure, with 23.5 parts by mass of sulfur and 0.5 part by mass of 2-(2-hydroxy-4-octyloxyphenyl)benzotriazole as a UV absorbing agent to thereby allow these compound to be dissolved. The obtained solution was mixed with 2.5 part by mass of bis(mercaptomethyl)-1,4-dithiane and 0.05 part by mass of 2-mercapto-N-methyhmidazole, and the resulting mixture was intimately mixed at 60° C. in a nitrogen atmosphere and reacted until the refractive index thereof was changed from about 1.657 to about 1.710. Thereafter, the reacted mixture was mixed with 0.12 part by mass of dibutyl tin dichloride and 0.01 part by mass of JP506H (available from Johoku Chemical Co., Ltd.) and then cooled to 30° C. The resulting mixture was further mixed with 2.5 parts by mass of bis(mercaptomethyl)-1,4-dithiane and 0.003 part by mass of tetrabutyl phosphonium bromide, and the resulting mixture was stirred for 30 minutes under a reduced pressure of 13.3 hPa for the removal of gases contained therein.

The obtained raw material was filtered through a PTFE membrane filter with a pore size of 5 µm, and successively poured into a mold cavity defined by a pair of lens-forming molds and a gasket. The poured raw material was heated from about 10° C. to 110° C. over 20 hours, maintained at 110° C. for 1 hour and allowed to stand for cooling to 70° C. Then, the gasket and molds were removed to obtain a cured optical resin. The resulting resin had a refractive index (ne) of 1.756 and an Abbe number of 30.

Blank 2:

One hundred parts by mass of bis(O-epithiopropyl) disulfide were mixed with 10 parts by mass of bis(mercaptomethyl)-1,4-dithiane, 0.5 part by mass of 2-(2-hydroxy-4-octyloxyphenyl)benzotriazole as a UV absorbing agent, 0.03 part by mass of N,N-dimethylcyclohexylamine and 0.01 part by mass of JP506H (available from Johoku Chemical Co., Ltd.), and the gases contained in the resulting mixture were removed under a reduced pressure of 13.3 hPa for 30 minutes.

The obtained raw material was filtered through a PTFE membrane filter with a pore size of 5 µm, and successively poured into a mold cavity defined by a pair of lens-forming molds and a gasket. The poured raw material was heated from about 30° C. to 100° C. over 20 hours, maintained at 100° C. for 1 hour and allowed to stand for cooling to 70° C. Then, the gasket and molds were removed to obtain a cured optical resin. The resulting resin had a refractive index (ne) of 1.735 and an Abbe number of 33.

Blank 3:

Ninety parts by mass of bis(β-epithiopropyl) sulfide were mixed with 5.0 parts by mass of hydroxy-3-phenoxypropyl methacrylate, 5.0 parts by mass of mercaptoethyl sulfide, 0.5 part by mass of 2-(2-hydroxy-4-octyloxyphenyl)-benzotriazole as a UV absorbing agent, 0.05 part by mass of tetrabutyl phosphonium bromide, and the gases contained in the resulting mixture were removed under a reduced pressure of 13.3 hPa for 30 minutes.

The obtained blank raw material was filtered through a PTFE membrane filter with a pore size of 5 µm, and successively poured into a mold cavity defined by a pair of lens-forming molds and a gasket. The poured raw material was heated from about 20° C. to 110° C. over 20 hours, maintained at 110° C. for 1 hour and allowed to stand for cooling to 70° C. Then, the gasket and molds were removed to obtain a cured optical resin. The resulting resin had a refractive index (ne) of 1.706 and an Abbe number of 36.

Blank 4:

Fifty two parts by mass of m-xylenediisocyanate (m-XDI) were mixed with 0.5 part by mass of 2-(2-hydroxy-4-octyloxyphenyl)benzotriazole as a UV absorbing agent, 0.20 part by mass of JP506H (available from Johoku Chemical Co., Ltd.) and 0.01 part by mass of dibutyl tin dichloride to thereby allow these compound to be dissolved. Then, 48.0 parts by mass of bis(mercaptoethylthio)mercaptopropane were added and uniformly mixed in the obtained solution. The gases contained in the resulting mixture were removed under a reduced pressure of 13.3 hPa for 30 minutes.

The obtained raw material was filtered through a PTFE membrane filter with a pore size of 5 µm, and successively poured into a mold cavity defined by a pair of lens-forming molds and a gasket. The poured raw material was heated from about 20° C. to 120° C. over 20 hours, maintained at 120° C. for 3 hours and allowed to stand for cooling to 70° C. Then, the gasket and molds were removed to obtain a cured optical resin. The resulting resin had a refractive index (ne) of 1.665 and an Abbe number of 33.

Example 1

In a mixture of 10 parts by mass of toluene and 50 parts by mass of xylene were dissolved 20 parts by mass of an acrylic main chain-Si(OH)$_3$ polymer and 5 parts by mass of 5-methyl-2-(2-hydroxy-4-decyloxyphenyl)-benzotriazole. The resulting solution was further mixed with 2 parts by mass of a leveling agent of an organic modified polysiloxane type for improving the wettability and for stabilizing the liquid. The resulting liquid was then uniformly mixed with 5 parts by mass of an organic silane compound before coating to obtain a coating liquid.

The coating liquid was impregnated into a non-woven fabric and applied to a peripheral edge of a plastic lens for spectacles which was made from each of the above-described blanks 1 to 4 and which was subjected to edging. The coating was cured at room temperature of about 23° C. for 24 hours to form a hardened resin layer as a hardened coating layer.

In order to evaluate the light resistance, each of the obtained plastic lenses for spectacles provided with the hardened coating layer was charged in a weather meter for 400 hours to determine whether or not any deterioration was observed. It was found that any of the lenses of the blanks 1 to 4 was almost free from undesirable coloration.

Further, in order to evaluate the adhesion, the coating liquid was applied to an optical surface of each of the bare plastic lens substrates by spin coating to form a film having a thickness of 3 µm. The film was cured in the same manner as that for the above treatment of the edged surface of the lens, namely at room temperature of about 23° C. for 24 hours, to form a hardened resin layer as a hardened coating layer. The adhesion of the hardened coating layer was evaluated by the cross-cut adhesion test. It was found that any of the lenses of the blanks 1 to 4 was free from peeling off of the coating.

Example 2

Fifteen parts by mass of 5-ethoxy-2-(2-hydroxy-4-octyloxyphenyl) benzotriazole were added to 15 parts by mass of a polyurethane emulsion to form a one-part aqueous coating liquid.

The coating liquid was charged in an applicator as shown in FIG. 2 and applied with the applicator to a peripheral edge of a plastic lens for spectacles which was made from each of the above-described blanks 1 to 4 and which was subjected to edging. The coating was cured at a temperature of 40° C. for 5 hours to form a hardened coating layer (hardened resin layer). Each of the plastic lenses for spectacles which was formed with the hardened coating layer was evaluated for its light resistance and adhesion in the same manner as that in Example 1. It was found that any of the lenses of the blanks 1 to 4 was free from undesirable coloration or peeling off of the coating, and was therefore satisfactory.

Example 3

The same coating liquid as that in Example 2 was charged in an applicator as shown in FIG. 3. In the same manner as that in Example 2, the coating liquid was applied with the applicator to a peripheral edge of a plastic lens for spectacles which was made from each of the above-described blanks 1 to 4 and which was subjected to edging, and cured to form a hardened coating layer. Each of the plastic lenses for spectacles which was formed with the hardened coating layer (hardened resin layer) was evaluated for its light resistance and adhesion in the same manner as that in Example 2. It was found that any of the lenses of the blanks 1 to 4 was free from undesirable coloration or peeling off of the coating, and was therefore satisfactory.

Industrial Applicability

The production process of the present invention provides a plastic lens for spectacles whose peripheral edge may be easily and effectively prevented from discoloring. Thus, the obtained plastic lens for spectacles may be used for a wide variety of spectacles.

Further, the coating liquid applicator of the present invention is suitably used for the process for producing the plastic lens for spectacles according to the present invention.

The invention claimed is:

1. A plastic lens for spectacles wherein a transparent hardened coating layer comprising a UV absorbing agent is formed on a peripheral edge of the plastic lens that has been subjected to edging, and wherein the UV absorbing agent is at least one selected from the group consisting of a benzotriazole-based compound, a benzophenone-based compound, and a cyanoacrylate-based compound.

2. A plastic lens for spectacles wherein a transparent hardened coating layer comprising a UV absorbing agent is formed on a machined surface of the plastic lens that has been subjected to machining for attachment to a frame, and wherein the UV absorbing agent is at least one selected from the group consisting of a benzotriazole-based compound, a benzophenone-based compound, and a cyanoacrylate-based compound.

3. The plastic lens for spectacles according to claim 1, wherein the UV absorbing agent is a benzotriazole-based compound.

4. The plastic lens for spectacles according to claim 1, wherein the hardened coating layer is formed from a coating liquid that is a one-part aqueous liquid containing a polyurethane emulsion.

5. The plastic lens for spectacles according to claim 1, wherein the hardened coating layer is formed from a coating liquid that is a two-part hardening material and is a mixed liquid comprising a first liquid comprising a siloxane cross-linkable reactive polymer and a second liquid comprising an organic silane compound.

6. The plastic lens for spectacles according to claim 1, wherein the hardened coating layer is formed from a coating liquid that comprises a blue dye.

7. The plastic lens for spectacles according to claim 1, wherein the plastic lens has optical surfaces on both sides thereof, and wherein each of said optical surfaces is optically finished and provided with a hard coating.

8. A process for producing a plastic lens for spectacles, comprising:
    edging a plastic lens,
    applying a coating liquid comprising a UV absorbing agent to a peripheral edge of the plastic lens formed by the edging, and
    curing the applied coating liquid to form a transparent hardened coating layer;
    wherein the UV absorbing agent is at least one selected from the group consisting of a benzotriazole-based compound, a benzophenone-based compound, and a cyanoacrylate-based compound.

9. A process for producing a plastic lens for spectacles, comprising:
    machining of a plastic lens for attachment to a frame,
    applying a coating liquid containing a UV absorbing agent to a machined surface formed by the machining for attachment to a frame, and
    curing the applied coating liquid to form a transparent hardened coating layer;
    wherein the UV absorbing agent is at least one selected from the group consisting of a benzotriazole-based compound, a benzophenone-based compound, and a cyanoacrylate-based compound.

10. The process for producing a plastic lens for spectacles according to claim 8, wherein the UV absorbing agent is a benzotriazole-based compound.

11. The process for producing a plastic lens for spectacles according to claim 8, wherein the coating liquid is a one-part aqueous liquid comprising a polyurethane emulsion.

12. The process for producing a plastic lens for spectacles according to claim 8, wherein the coating liquid is a two-part hardening material and is a mixed liquid comprising a first liquid comprising a siloxane cross-linkable reactive polymer and a second liquid comprising an organic silane compound.

13. The process for producing a plastic lens for spectacles according to claim 8, wherein the coating liquid comprises a blue dye.

14. The process for producing a plastic lens for spectacles according to claim 8, wherein the produced plastic lens has optical surfaces on both sides thereof, and wherein each of said optical surfaces is optically finished and provided with a hard coating.

15. The plastic lens according to claim 2, wherein the UV absorbing agent is a benzotriazole-based compound.

16. The plastic lens according to claim 2, wherein the hardened coating layer is formed from a coating liquid that is a one-part aqueous liquid containing a polyurethane emulsion.

17. The plastic lens according to claim 2, wherein the hardened coating layer is formed from a coating liquid that is a two-part hardening material and is a mixed liquid comprising a first liquid comprising a siloxane cross-linkable reactive polymer and a second liquid comprising an organic silane compound.

18. The plastic lens according to claim 2, wherein the hardened coating layer is formed from a coating liquid that comprises a blue dye.

19. The plastic lens according to claim 2, wherein the plastic lens has optical surfaces on both sides thereof, and wherein each of said optical surfaces is optically finished and provided with a hard coating.

20. The process according to claim 9, wherein the UV absorbing agent is a benzotriazole-based compound.

21. The process according to claim 9, wherein the coating liquid is a one-part aqueous liquid comprising a polyurethane emulsion.

22. The process according to claim 9, wherein the coating liquid is a two-part hardening material and is a mixed liquid comprising a first liquid comprising a siloxane cross-linkable reactive polymer and a second liquid comprising an organic silane compound.

23. The process according to claim 9, wherein the coating liquid comprises a blue dye.

24. The process according to claim 9, wherein the produced plastic lens has optical surfaces on both sides thereof, and wherein each of said optical surfaces is optically finished and provided with a hard coating.

\* \* \* \* \*